April 12, 1960 H. PRUCHNOW 2,932,072
ONE PIECE CORD HOLDER
Filed April 28, 1958
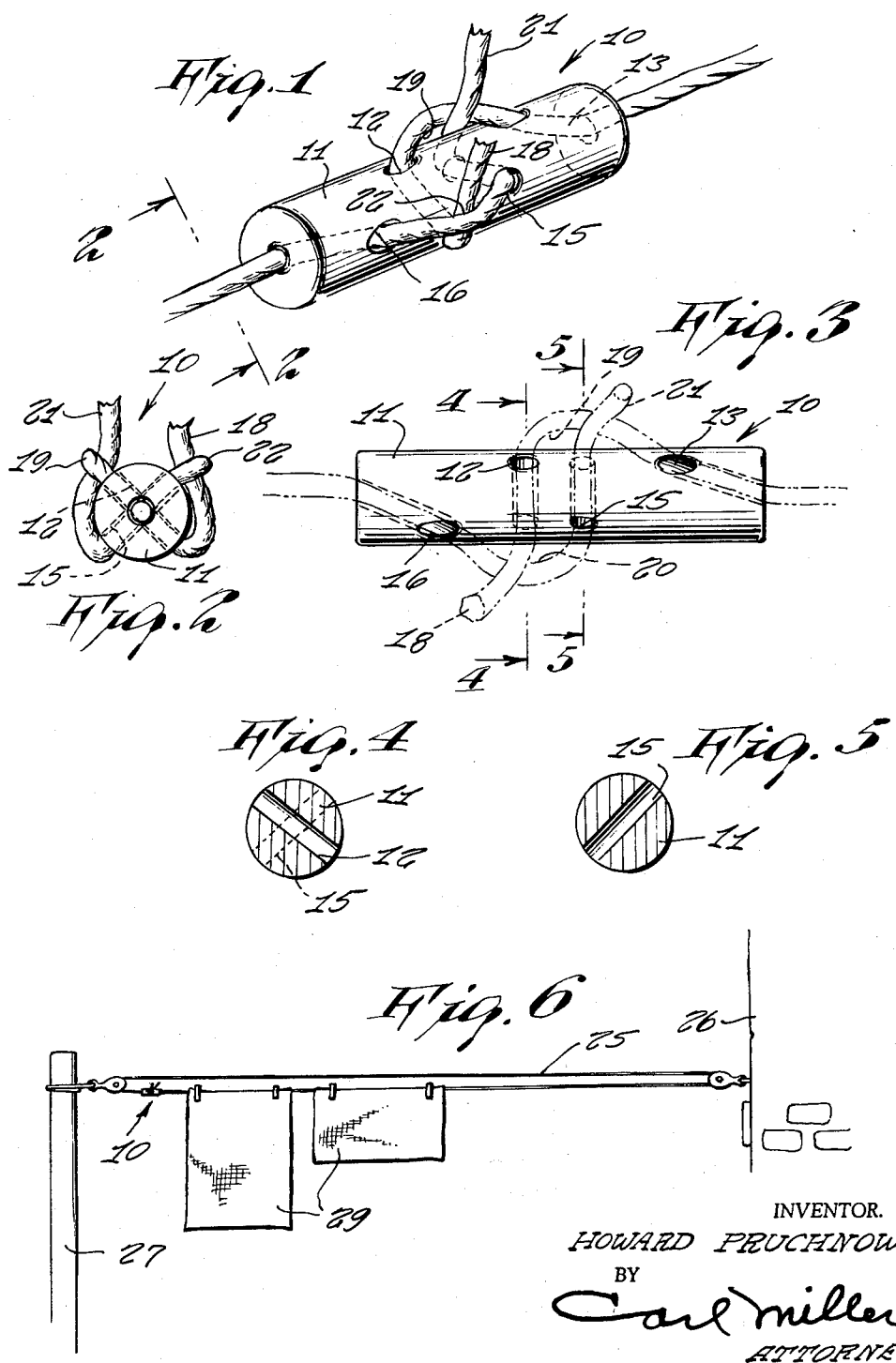
INVENTOR.
HOWARD PRUCHNOW
BY
Carl Miller
ATTORNEY

United States Patent Office 2,932,072
Patented Apr. 12, 1960

2,932,072

ONE PIECE CORD HOLDER

Howard Pruchnow, Brooklyn, N.Y.

Application April 28, 1958, Serial No. 731,439

3 Claims. (Cl. 24—129)

This invention relates to fastening means and, more particularly, to a device for securing ends of flexible cable.

It is often necessary to splice together the ends of a single or a plurality of lathes of flexible cable, such as clothes lines, wire cable, and the like. While various types of clamps and splicing joints have been used for this purpose, such often form an integral part of the cable or otherwise prevent the selective release thereof when required. This is particularly true in such cases where it is desired to tighten or adjust a cable for a particular purpose, such as in the case of clothes lines. It is therefore an object of the present invention to provide a flexible cable clamp for securing ends of flexible cable together that is extremely simple in construction, efficient in operation, and which will overcome the aforementioned difficulties.

Another object of the present invention is to provide a holding device for flexible cables of various types in which the ends of the cable cooperate to retain each of the other ends of the cable against displacement out of the clamping device.

Still a further object of the present invention is to provide a cable clamp of the type described which can be manufactured in large quantities at relatively low cost.

All of the foregoing and still further objects and advantages of this invention will become apparent from a study of the following specification, taken in connection with the accompanying drawing, wherein:

Figure 1 is a perspective view of a flexible cable clamp made in accordance with the present invention in operative use;

Figure 2 is an end elevational view, taken along line 2—2 of Figure 1;

Figure 3 is a side elevational view of the device shown in Figure 1 with the cable removed therefrom and shown in phantom lines;

Figure 4 is a transverse cross sectional view taken along line 4—4 of Figure 3;

Figure 5 is a transverse cross sectional view taken along line 5—5 of Figure 3; and Figure 6 is a side elevational view of the device made in accordance with the present invention in operative use with a clothes line.

Referring now to the drawing, and more particularly to Figures 1 to 5 thereof, a clamp 10 made in accordance with the present invention is shown to include a cylindrical main body member 11 constructed from any rigid unbreakable material. This cylindrical member includes first means for receiving a first end of a flexible cable and second means for receiving another end of a flexible cable. The first such means includes a first transverse bore 12 extending across a mid section of the main body member 11 and a first longitudinal bore 13 extending diagonally through one end of the member 11. The second such means includes a second transverse bore 15 extending diametrically through a mid portion of the member 11 between the first transverse bore 12 and the first longitudinal bore 13; also, a second longitudinal bore 16 that extends diagonally through the opposite end of the member 11.

In applying two ends of flexible cable, whether they be the opposite ends of a single cable or the ends of two different cables, may be releasably secured together in the following manner. A first cable end 18 is threaded through the first longitudinal bore 16 and through the first transverse bore 15. The second cable end is threaded through the second longitudinal bore 16 and then through the second transverse bore 15. The portion of the first cable end 18 between the first longitudinal bore 13 and the first transverse bore 12 is formed into a small loop 19 for receiving the extremity of the second cable end 21. Similarly, that portion of the second cable end between the second longitudinal bore 16 and the second transverse bore 15 is formed into a small loop 22 for receiving the extremity of the first cable end 18. By then exerting an outward pull upon the outwardly extending parts of the cable adjacent to the ends of the main body member 11, the loops 19, 22 will be drawn taut thus mutually preventing disengagement of the associated cable ends by locking them against the sides of the cylindrical main member 11. It will be noted that the first transverse bore 12 and first longitudinal bore 13 lie in a first plane that is perpendicular to the second plane containing the second transverse bore 15 and second longitudinal bore 16 whereby the proper bends are caused to be made in the cable ends to provide the proper clamping action, as is more clearly shown in Figure 2 of the drawing.

One use of this device 10 is illustrated in Figure 6 of the drawing, wherein it is used to tighten and loosen a clothes line 25 that is strung between a building 26 and a pawl 27. As the line stretches due to the heavy weight of clothes supported thereon, the length of the line and thus the tautness thereof can be conveniently adjusted whenever required. This device is equally as well useful for splicing together the ends of the same or different cable lengths.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A cable clamp comprising, in combination, a rigid cylindrical main body portion, first means carried by said main body portion for receiving one end of a flexible cable, second means carried by said main body portion for receiving another end of a flexible cable, looped portions of each of said flexible cable ends each overlying and frictionally securing the other of such ends between said main body portion and said respective looped portion against displacement relative to said main body portion, said first means comprising a first portion of said main body portion defining a bore extending angularly through one end of said cylindrical rigid main body portion, and said second means comprising a second position of said main body position defining a bore extending angularly through the opposite end of said rigid cylindrical main body portion, and additional portions defining bores extending diametrically through the center of said cylindrical main body portion, said diametrically extending bores being directed in different directions through said cylindrical main body portion.

2. A cable clamp comprising, in combination, a rigid main body portion, first means carried by said main body portion for receiving an end of a flexible cable, second means carried by said main body portion receiving another end of a flexible cable and portions of each of said flexible cable ends securing the other of such ends against displacement relative to said main body portion, said main body portion comprising a rigid cylindrical member, said first means carried by said body portion for receiving an end of the flexible cable comprising a first portion defining a first transverse bore extending diametrically through the mid portion of said cylindrical portion, and said first portion defining a first diagonal bore having an axis contained in a first plane common to the longitudinal axis of said first transverse bore and extending diagonally through an end of said member, said second means comprising a second portion defining a second transverse bore extending through a mid portion of said member between said first transverse bore and said first diagonal bore, and said second portion defining a second diagonal bore having a longitudinal axis contained in a second plane common to the longitudinal axis of said second transverse bore and extending diagonally through the opposite end of said member.

3. A flexible cable clamp as set forth in claim 2, wherein said first and second plane are substantially perpendicular to each other.

References Cited in the file of this patent

UNITED STATES PATENTS

| | | |
|---|---|---|
| 114,119 | England | Apr. 25, 1871 |
| 668,828 | Bell | Feb. 26, 1901 |
| 670,328 | Rigby | Mar. 19, 1901 |
| 879,941 | Rothin | Feb. 25, 1908 |
| 2,506,274 | Maxwell et al. | May 2, 1950 |